(12) United States Patent
Tavabi et al.

(10) Patent No.: US 11,520,900 B2
(45) Date of Patent: Dec. 6, 2022

(54) SYSTEMS AND METHODS FOR A TEXT MINING APPROACH FOR PREDICTING EXPLOITATION OF VULNERABILITIES

(71) Applicant: Arizona Board of Regents on Behalf of Arizona State University, Tempe, AZ (US)

(72) Inventors: Nazgol Tavabi, Marina Del Rey, CA (US); Palash Goyal, Los Angeles, CA (US); Kristina Lerman, Los Angeles, CA (US); Mohammed Almukaynizi, Chandler, AZ (US); Paulo Shakarian, Chandler, AZ (US)

(73) Assignees: Arizona Board of Regents on Behalf of Arizona State University, Tempe, AZ (US); University of Southern California, Marina del Rey, CA (US)

( * ) Notice: Subject to any disclaimer, the term of this patent is extended or adjusted under 35 U.S.C. 154(b) by 222 days.

(21) Appl. No.: 16/548,329

(22) Filed: Aug. 22, 2019

(65) Prior Publication Data
US 2022/0229912 A1    Jul. 21, 2022

Related U.S. Application Data

(60) Provisional application No. 62/721,401, filed on Aug. 22, 2018.

(51) Int. Cl.
*G06F 21/57* (2013.01)
*H04L 9/40* (2022.01)
*H04L 51/216* (2022.01)
*G06F 40/279* (2020.01)

(52) U.S. Cl.
CPC .......... *G06F 21/577* (2013.01); *G06F 40/279* (2020.01); *H04L 51/216* (2022.05); *H04L 63/1416* (2013.01); *H04L 63/1425* (2013.01); *H04L 63/1433* (2013.01); *G06F 2221/033* (2013.01)

(58) Field of Classification Search
CPC .............. G06F 21/577; H04L 63/1416; H04L 63/1425; H04L 63/1433
See application file for complete search history.

(56) References Cited

U.S. PATENT DOCUMENTS

| | | | | |
|---|---|---|---|---|
| 10,114,954 B1 * | 10/2018 | Bellis | ..................... | G06F 21/577 |
| 10,176,438 B2 * | 1/2019 | Shakarian | ............. | G06F 21/562 |
| 10,313,385 B2 | 6/2019 | Shakarian et al. | | |
| 10,397,272 B1 * | 8/2019 | Bruss | ..................... | G06N 20/00 |
| 10,437,945 B2 | 10/2019 | Shakarian et al. | | |

(Continued)

FOREIGN PATENT DOCUMENTS

| | | | | |
|---|---|---|---|---|
| WO | WO-2014152469 A1 * | 9/2014 | ............. | G06F 21/52 |
| WO | 2015200046 A1 | 12/2015 | | |

(Continued)

OTHER PUBLICATIONS

U.S. Appl. No. 16/640,878, filed Feb. 21, 2020, Shakarian et al.

(Continued)

*Primary Examiner* — Sarah Su
(74) *Attorney, Agent, or Firm* — Polsinelli PC (57) ABSTRACT

Various embodiments of a computer-implemented framework for predicting exploitation of software vulnerabilities are disclosed.

4 Claims, 6 Drawing Sheets

(56) References Cited

U.S. PATENT DOCUMENTS

| | | | |
|---|---|---|---|
| 10,754,959 B1* | 8/2020 | Rajasooriya | G06F 21/567 |
| 2016/0188396 A1* | 6/2016 | Sonalker | G06F 11/079 714/37 |
| 2016/0188876 A1* | 6/2016 | Harris | G06N 20/00 726/23 |
| 2016/0371490 A1* | 12/2016 | Shakarian | G06N 99/00 |
| 2018/0150635 A1* | 5/2018 | Melvin | G06N 20/00 |
| 2018/0165597 A1* | 6/2018 | Jordan | G06N 7/005 |
| 2018/0197089 A1* | 7/2018 | Krasser | G06F 21/56 |
| 2018/0270261 A1* | 9/2018 | Pande | H04L 63/1425 |
| 2018/0288086 A1* | 10/2018 | Amiri | G06F 40/126 |
| 2018/0375896 A1* | 12/2018 | Wang | H04L 63/1416 |
| 2019/0114417 A1* | 4/2019 | Subbarayan | G06N 20/00 |
| 2019/0138731 A1* | 5/2019 | Tan | G06F 11/3608 |
| 2019/0183403 A1 | 6/2019 | Gand | |
| 2019/0222602 A1* | 7/2019 | Linder | G06F 16/24578 |
| 2019/0347327 A1 | 11/2019 | Patil et al. | |
| 2019/0347428 A1* | 11/2019 | Youssefi | G06F 21/577 |
| 2019/0349393 A1 | 11/2019 | Nunes et al. | |
| 2019/0379692 A1* | 12/2019 | Garcia Duran | H04L 63/1441 |
| 2020/0036743 A1 | 1/2020 | Almunkaynizi et al. | |
| 2020/0053121 A1* | 2/2020 | Wilcox | G06N 3/08 |
| 2020/0057857 A1* | 2/2020 | Roytman | G06F 21/577 |
| 2020/0074078 A1* | 3/2020 | Saxe | G06F 21/56 |
| 2020/0285752 A1 | 9/2020 | Wyatt et al. | |
| 2020/0356675 A1* | 11/2020 | Shakarian | G06K 9/6267 |
| 2021/0075814 A1* | 3/2021 | Bulut | H04L 63/102 |
| 2021/0185066 A1* | 6/2021 | Shah | G06N 20/10 |
| 2021/0209512 A1* | 7/2021 | Gaddam | G06N 20/10 |
| 2021/0234892 A1* | 7/2021 | Narayanaswamy | H04L 63/20 |

FOREIGN PATENT DOCUMENTS

| | | |
|---|---|---|
| WO | 2019089389 A1 | 5/2019 |
| WO | 2019157335 A1 | 8/2019 |

OTHER PUBLICATIONS

U.S. Appl. No. 16/968,499, filed Aug. 7, 2020, Shakarian et al.
U.S. Appl. No. 16/653,899, filed Oct. 15, 2020, Sarkar et al.
U.S. Appl. No. 16/875,540, filed May 15, 2020, Nunes et al.
Rapid7. Exploit database. rapid7.com/db/.
Symantec. 2017a. Attack signatures—Symantec corp. https://www.broadcom.com/support/security-center/attacksignatures.
Vulnerability database, N. 2013. Nvd. https://nvd.nist.gov/vuln/detail/CVE-2013-0285.
ADOBE. 2012. Adding priority ratings to adobe security bulletins.
Allodi, L., and Massacci, F. 2014. Comparing vulnerability severity and exploits using case-control studies. ACM Trans. Inf. Syst. Secur. 17(1):1-1:20.
Bengio, Y.; Ducharme, R.; Vincent, P.; and Jauvin, C. 2003. A neural probabilistic language model. Journal of Machine Learning Research 3:1137-1155.
Bozorgi, M.; Saul, L. K.; Savage, S.; and Voelker, G. M. 2010. Beyond heuristics: Learning to classify vulnerabilities and predict exploits. In KDD2010, 105-114.
Collobert, R., and Weston, J. 2008. A unified architecture for natural language processing: Deep neural networks with multitask learning. In ICML, 160-167.
Cortes, C., and Vapnik, V. 1995. Support-vector networks. Mach. Learn. 20(3):273-297.
Edkrantz, M., and Said, A. 2015. Predicting cyber vulnerability exploits with machine learning. In SCAI. exploit database. 2009. Exploit database by offensive security.
Hao, S.; Kantchelian, A.; Miller, B.; Paxson, V.; and Feamster, N. 2016. Predator: Proactive recognition and elimination of domain abuse at time-of-registration. In CCS2016,1568-1579.
Kostov, N.; Neumann, J.; and Woo, S. 2017. Cyberattack victims begin to assess financial damage. Wall Street Journal.
Le, Q., and Mikolov, T. 2014. Distributed representations of sentences and documents. In Xing, E. P., and Jebara, T.,eds., ICML, vol. 32, 1188-1196.
Liu, Y.; Sarabi, A.; Zhang, J.; Naghizadeh, P.; Karir, M.; Bailey, M.; and Liu, M. 2015. Cloudy with a chance of breach: Forecasting cyber security incidents. In Usenix Security.
Marin, E.; Diab, A.; and Shakarian, P. 2016. Product offerings in malicious hacker markets. In ISI, 187-189. Microsoft. 2008. Exploitability index.
Martin, G.; Kinross, J.; and Hankin, C. 2017. Effective cybersecurity is fundamental to patient safety.
Microsoft. 2008. Exploitability index.
Mikolov, T.; Chen, K.; Corrado, G.; and Dean, J. 2013a. Efficient estimation of word representations in vector space. arXiv preprint arXiv:1301.3781.
Mikolov, T.; Sutskever, I.; Chen, K.; Corrado, G. S.; and Dean, J. 2013b. Distributed representations of words and phrases and their compositionality. In NIPS, 3111-3119.
Mittal, S.; Das, P. K.; Mulwad, V.; Joshi, A.; and Finin, T. 2016. Cybertwitter: Using twitter to generate alerts for cybersecurity threats and vulnerabilities. In ASONAM, 860-867.
Mnih, A., and Hinton, G. 2007. Three new graphical models for statistical language modelling. In ICML, 641-648.
Nunes, E.; Diab, A.; Gunn, A.; Marin, E.; Mishra, V.; Paliath, V.; Robertson, J.; Shakarian, J.; Thart, A.; and Shakarian, P. 2016. Darknet and deepnet mining for proactive cybersecurity threat intelligence. In ISI, 7-12. IEEE.
Quinlan, J. R. 1986. Induction of decision trees. Mach. Learn. 1(1):81-106.
Quinn, S. D.; Scarfone, K. A.; Barrett, M.; and Johnson, C. S. 2010. Sp 800-117. guide to adopting and using the security content automation protocol (scap) version 1.0. Technical report, Gaithersburg, MD, United States.
Robertson, J.; Diab, A.; Marin, E.; Nunes, E.; Paliath, V.; Shakarian, J.; and Shakarian, P. 2017. Darkweb CyberThreat Intelligence Mining. Cambridge University Press.
Rumelhart, D. E.; Hinton, G. E.; and Williams, R. J. 1988. Neurocomputing: Foundations of research. Cambridge,MA, USA: MIT Press. Chapter Learning Representations by Back-propagating Errors, 696-699.
Sabottke, C.; Suciu, O.; and Dumitras, T. 2015. Vulnerability disclosure in the age of social media: Exploiting twitter for predicting real-world exploits. In USENIX, 1041-1056.
Samtani, S.; Chinn, K.; Larson, C.; and Chen, H. 2016. Azsecure hacker assets portal: Cyber threat intelligence and malware analysis. In ISI, 19-24.
Scarfone, K., and Mell, P. 2009. An analysis of cvss version 2 vulnerability scoring. In SESM, 516-525.
Shakarian, J.; Gunn, A. T.; and Shakarian, P. 2016. Exploring malicious hacker forums. In Cyber Deception. Springer.261-284.
Soska, K., and Christin, N. 2014. Automatically detecting vulnerable websites before they turn malicious. In Usenix Security, 625-640.
Tavabi et al., Proceedings of AAAI Conference on Innovative Application of AI (IAAI-2018).

* cited by examiner

SYSTEMS AND METHODS FOR A TEXT MINING APPROACH FOR PREDICTING EXPLOITATION OF VULNERABILITIES

CROSS REFERENCE TO RELATED APPLICATIONS

This is a non-provisional application that claims benefit to U.S. provisional patent application Ser. No. 62/721,401 filed on Aug. 22, 2018, which is herein incorporated by reference in its entirety.

GOVERNMENT SUPPORT

This invention was made with government support under FA8750-16-C-0112 awarded by the Air Force Research Laboratory. The government has certain rights in the invention.

FIELD

The present disclosure generally relates to cyber security and threat assessment; and in particular, to systems and methods for a text-mining approach for predicting exploitation of vulnerabilities.

BACKGROUND

Software vulnerabilities can expose computer systems to attacks by malicious actors. The consequences of an attack can be severe, as demonstrated on May 12, 2017, when Wannacry ransomware, exploiting a vulnerability related to the Microsoft Windows operating system, crippled hundreds of thousands of computer systems worldwide, including critical systems used by hospitals and other health services. To avoid attacks on their software, vendors need to create patches for discovered vulnerabilities.

However, not all vulnerabilities are equally critical to patch. While a growing number of vulnerabilities are discovered each year (in the first four months of 2017 alone more than 5,000 vulnerabilities were disclosed by National Vulnerability Database (NVD)), fewer than 3% of these have corresponding exploits that exist in the wild. Given that so few numbers of vulnerabilities have been exploited, it is often difficult to determine which vulnerabilities should be addressed, and creating timely patches or otherwise addressing all vulnerabilities may not always be feasible. It is also not feasible to assume that every vulnerability will be exploited by attackers.

It is with these observations in mind, among others, that various aspects of the present disclosure were conceived and developed.

Corresponding reference characters indicate corresponding elements among the view of the drawings. The headings used in the figures do not limit the scope of the claims.

DETAILED DESCRIPTION

Various embodiments of a computer-implemented exploit-prediction framework are described herein. In some embodiments, the framework leverages a neural language modeling approach in order to learn low dimensional context-based distributed representations, i.e., embeddings, of darkweb/deepweb discussions which may then be used to predict whether vulnerabilities, associated with software, hardware, or combinations thereof, will be exploited. By capturing context and/or linguistic regularities of human language, such as syntactic, semantic similarity and logic analogy, the learned embeddings accommodate more accurate classification of discussions about exploited vulnerabilities which is a technical improvement to general text analysis exploit prediction methods.

Introduction and Technical Challenges of Exploit Prediction

A great deal of the current research on cybersecurity defense in exploit prediction has focused on detecting emerging cyber threats. Although limited, the work on predicting cybersecurity incidents is gaining larger attention in recent years. Several approaches to evaluating the severity of software vulnerabilities and predicting whether they will be exploited have been pursued. The National Institute of Standards and Technology (NIST) uses Common Vulnerability Scoring System (CVSS) to assess the severity of the vulnerability. This metric assigns a score to a vulnerability, which is formulated using different characteristics such as ease of exploit and scale of damage it may cause if exploited. Unfortunately, this metric was proven to be ineffective, since it marks many vulnerabilities as exploitable even though a majority of them will never be attacked. This is also the shortcoming of other standard scoring systems, such as Microsoft's exploitability index and Adobe Priority Rating.

With the ever growing number of vulnerabilities discovered and the threats they pose, different data sources have been generated and are publicly available to help enhance cybersecurity. The NVD (National Vulnerability Database) is provided by NIST which has a list of vulnerabilities disclosed. NVD also contains descriptions, CVSS scores and other metrics for each vulnerability. ExploitDB is a repository for exploits reported by security researchers. It provides proof-of-concept exploits which show that a vulnerability is exploitable but not necessary exploited. Another data source is blog posts written by cyber security experts, security analysts, as well as white hat hackers which have not been used in previous works and provide news and updated information about cyber security topics.

Discussions surrounding a particular vulnerability in social media, for example, Twitter or marketplaces on the darkweb, can provide information related to predict exploitation. However, conventional technologies primarily look to the words surrounding that vulnerability, which fails to capture semantics of the words and leads to data sparsity and high dimensionality. These conventional technologies also fail to capture the context of the discussions, and thus fail to effectively distinguish between potentially threatening posts and non-malicious discussions of vulnerabilities. The following two posts below illustrate these differences.

" . . . first advertise of this kit after several months of shutdown. rates for wm are 20/30% prices:100$/day600$/week2000$/month . . . exploits:cve-2015-5122cve-2015-5119cve-2015-3043cve-2015-2419cve-2015-2445cve-2015-0311cve-2014-6332 . . . "

" . . . this is a really dangerous security flaw. poc of cve-2014-0476 is available lookup google linux kernel vulnerable to privilege escalation and dos attack"

The first post advertises an exploit kit for sale on a darkweb marketplace with a considerable price, which is a leading indicator of an attack. In contrast, the second post simply talks about a vulnerability. Given the words in the two posts, the second post seems more likely to be connected to a threat, but this is actually not the case. This example highlights the technical challenges presented and the drawbacks of conventional text mining methods that are unable to capture the context of words and would fail to detect the differences between such discussions. Another disadvantage is that conventional methods use sparse, high-dimensional features, which may lead to suboptimal performance in a classification task.

Proposed Technical Improvement to Exploit Prediction

Figure 1A:
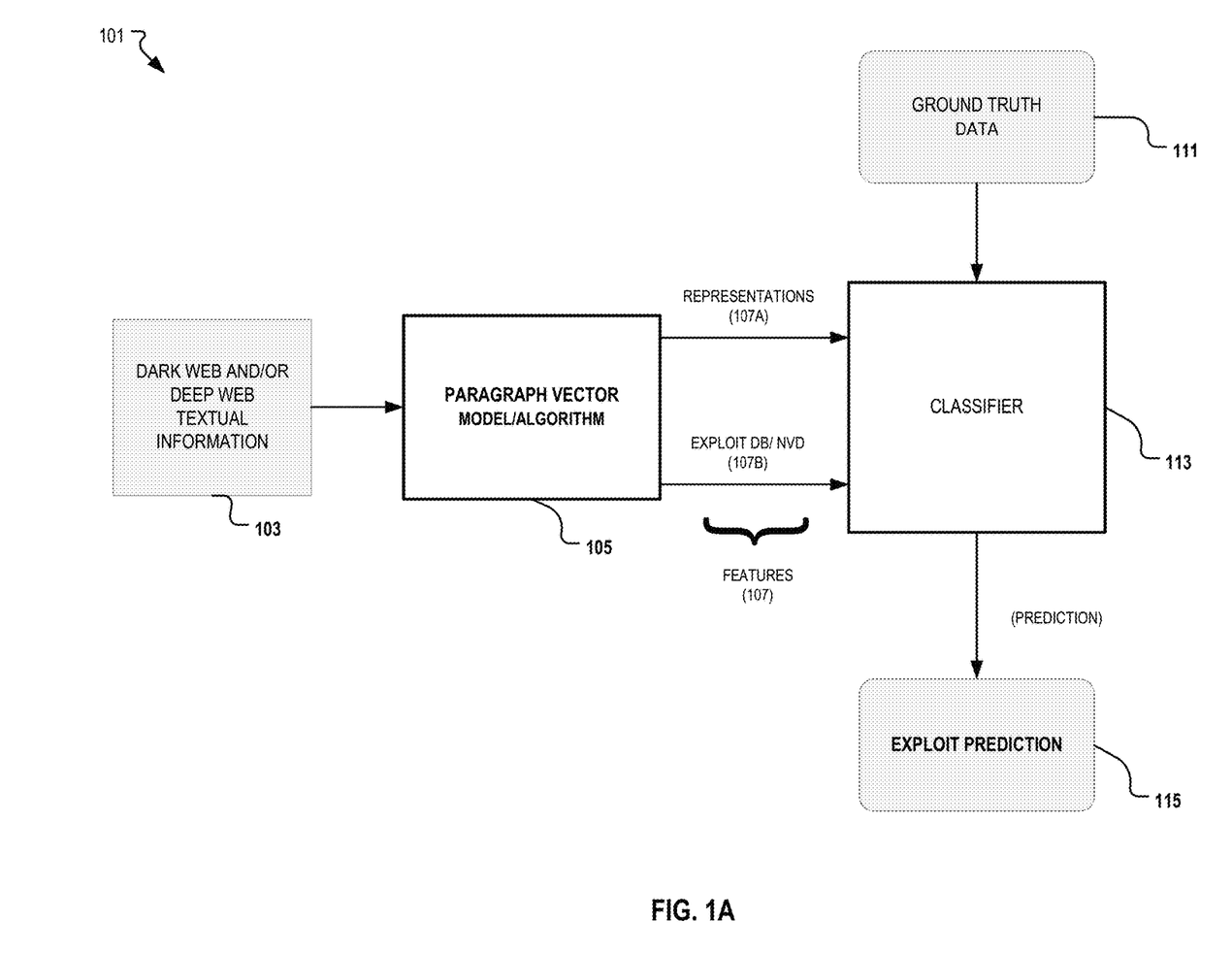
FIG. 1A is a simplified block diagram of a system or network for an exploit prediction framework.

Referring to FIG. 1A, and responsive to the above technical challenges, the present disclosure is directed to a technical improvement in the form of a computer-implemented framework 101 that includes at least the following components: (1) learning embeddings of D2Web posts, and (2) exploit classification; and FIG. 1A illustrates the juxtaposition of these components. Deep web and/or dark web textual information 103 in the form of posts, discussions, communications, or textual information in any form may be accessed and inputted to a paragraph vector algorithm 105 or other neural network model as described herein. The paragraph vector algorithm 105 (or other neural network) may then be used to process the textual information 103 to generate features 107. The features 107 may include distributed representations 107A of posts from the textual information 103 accessed. In some embodiments, the features 107 may also include a CVSS score and exploitDB (107B). The features 107 may then be used as inputs to a classifier 113 along with ground truth 111, to train the classifier 113 to predict whether vulnerabilities mentioned in posts or other forms of the textual information 103 will be exploited; i.e., the classifier 113 is configured to output an exploit prediction 115 by processing information associated with communications involving a vulnerability.

In some embodiments, the framework 101 may include a neural language model that analyzes discussions about vulnerabilities to predict whether they will be exploited in the wild. The paragraph vector algorithm 105 may be an unsupervised algorithm that embeds variable-length texts in a low-dimensional vector space, to learn distributed representations of discussions on the darkweb or deepweb (collectively known as D2Web). As described, the classifier 113 is then trained to recognize posts discussing vulnerabilities that will be exploited in the wild.

The paragraph vector method described herein is effective because it captures the meaning of discussions and their other characteristics, such as language and indicator words. Evaluations show that the paragraph vector outperforms classifiers which use word frequencies by 10% in predicting exploited vulnerabilities. The paragraph vector method also decreases the dimension of the feature space by 0.001 of the original values. Moreover, it is shown that adding other features, such as CVSS score of the vulnerability and whether it appeared in ExploitDB, improves prediction performance by 12%.

Figure 1B:
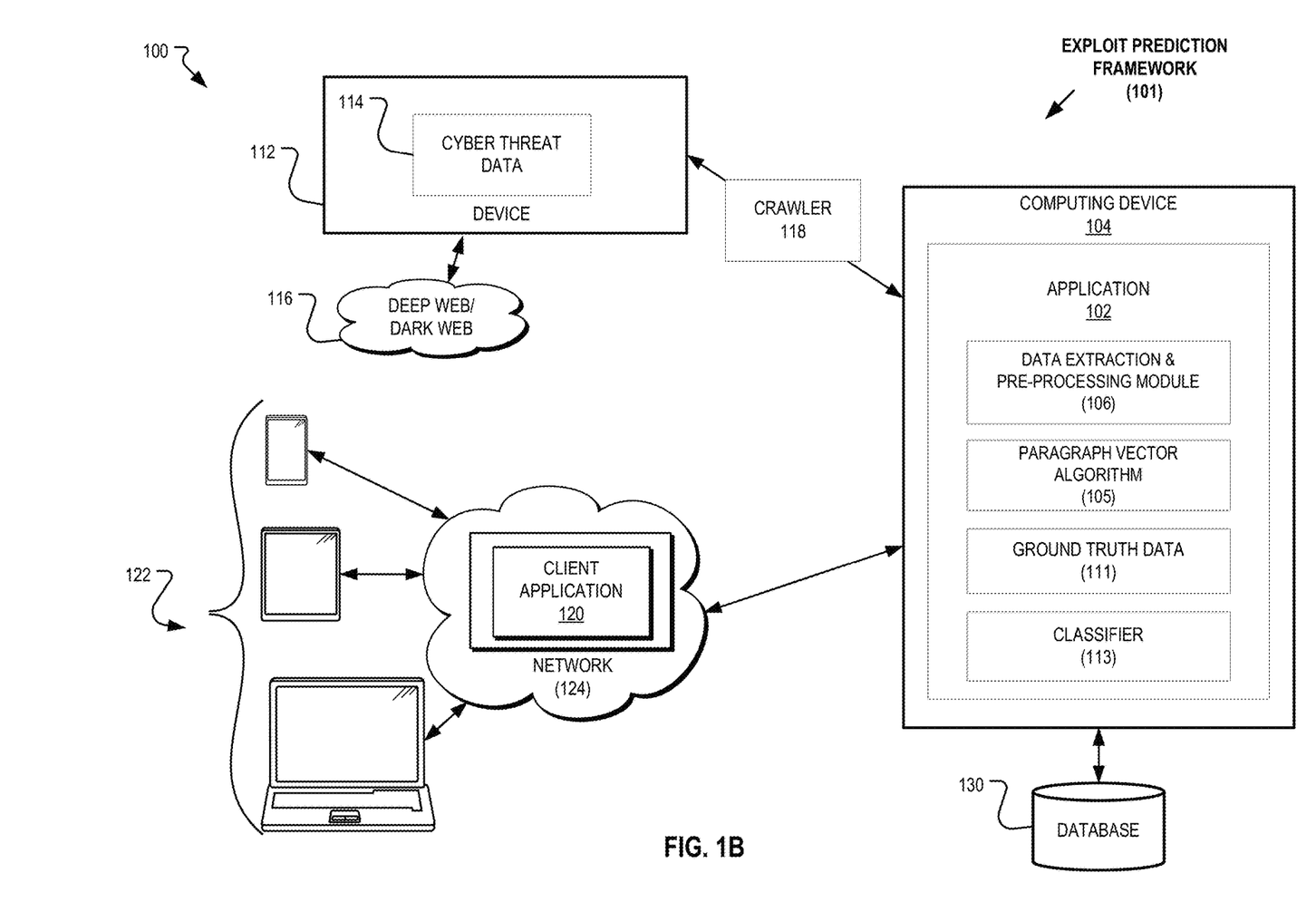
FIG. 1B is a simplified illustration showing the exploit prediction framework.

Referring to FIG. 1B, a system 100 is shown that may be used to implement the framework 101. In particular, aspects of the framework 101 may take the form of an application 102 implemented by at least one computing device 104, which may be a server, a computing system, or implemented as part of a cloud-computing environment. Using the application 102, the computing device 104 may be configured to execute or otherwise perform operations associated with exploit prediction as defined by the framework 101 and further described herein. In other words, functions or services provided by the application 102 may be implemented as code and/or machine-executable instructions executable by the computing device 104 that may represent one or more of a procedure, a function, a subprogram, a program, a routine, a subroutine, a module, a software package, a class, or any combination of instructions, data structures, or program statements, and the like. As such, embodiments of the application 102 and the framework 101 described herein may be implemented by hardware, software, firmware, middleware, microcode, hardware description languages, or any combination thereof. When implemented in software, firmware, middleware, or microcode, the program code or code segments to perform the necessary tasks (e.g., a computer-program product) may be stored in a computer-readable or machine-readable medium, and a processor(s) associated with the computing device 104 may perform the tasks defined by the code.

The computing device 104 may be configured to execute or otherwise perform components of the application 102 including a data extraction and pre-processing module 106, the paragraph vector algorithm 105, the ground truth 111, and the classifier 113. In some embodiments, any of the aforementioned components of the application 102 may be implemented as code and/or machine-executable instructions executable by the computing device 104 that may represent one or more of a procedure, a function, a subprogram, a program, a routine, a subroutine, a module, a software package, a class, or any combination of instructions, data structures, or program statements, and the like.

As shown, the system 100 may further include at least one device 112 in operable communication with the computing device 104. In some embodiments, the computing device 104 may access or be in operable communication with the device 112 to obtain cyber threat data 114 from the dark web or deep web 116, including textual information 103 as described herein. The device 210 may include any electronic device capable of accessing/tracking the cyber threat data 114 from the dark web or deep web 116.

In some embodiments, the framework 101 includes one or more of a crawler 118. To collect the textual information 103, the crawler 118 is used for crawling the darkweb and deepweb. In this context, the darkweb refers to sites accessed through anonymization protocols such as Tor and I2P, while the deepweb refers to non-indexed sites on the open Internet. The crawler 118 handles sites of both types. The crawler 118 may include any number of lightweight crawlers and parsers that are focused on specific sites. Crawlers and parsers may be manually created for a manually-compiled list of any number of predetermined sites relating to malicious hacking and/or online financial fraud, including fishing, spear-fishing, ransomware, credit card frauds, etc. The crawler 118 of the framework 101 is also configured to ensure that the obtained data remains relevant to cyber-security: indeed, many darkweb and deepweb sites also create forums for other illicit activities, such as drug markets and the sale of stolen goods.

As further shown, the system 100 may include a client application 120 which may be configured to provide aspects of the framework 101 to any number of client devices 122 via a network 124, such as the Internet, a local area network, a cloud, and the like. In addition, exploit data, metadata, and other forms of data may be stored within a database 130.

Features

Natural language processing popularized distributed representation learning and introduced a family of neural language models to model sequences of words in sentences and documents. These models embed words in a fixed-dimension vector space, such that words in similar contexts tend to produce similar representations in vector space. These distributed representations of words capture many linguistic regularities of human language, such as syntactic, semantic similarity and logical analogy. A context-based representation of D2Web posts may be learned in two steps. First, distributed representations of words using word embedding may be learned. To go from distributed representations of words to distributed representations of variable-length D2Web posts, vectors may be simply aggregated of all the words contained in a post and compute their average. However, these methods do not work as well as using paragraph embedding to learn the global context of words in the entire post. These methods are described below. An embedding projects words in a lower-dimensional vector space with d dimensions, so that each word $w_i$ is represented by a d-dimensional vector $v_i$. Words that are used in similar contexts will be closer to one another in this vector space. While context usually implies semantic or meaning of the word, here it simply captures how the word is used within a sequence of words. For example, given two sentences—"The cat sat on the mat." and "The dog sat on the floor."—"dog" and "cat" are used in similar contexts, and thus, may be similar.

Of the many proposed models for learning distributed representations, Skip-Gram with Negative Sampling (SGNS) may be utilized. The model takes as input a tokenized text corpus $C=\{w_1, w_2, \ldots, w_n\}$ and creates a context for each word $w_i$ as $\{w_{i-k}, \ldots, w_{i-1}, w_{i+1}, \ldots, w_{i+k}\}$ where k is the context length. Given the embedding of word $w_i$, $v_i$, the model aims to reconstruct the embedding of the context, $\{v_{i-k}, \ldots, v_{i-1}, v_{i+1}, \ldots, v_{i+k}\}$. It randomly samples "negative" examples i.e. words which do not co-occur together and maximizes (minimizes) the probability of observing positive (negative) examples from the data.

Figure 2:
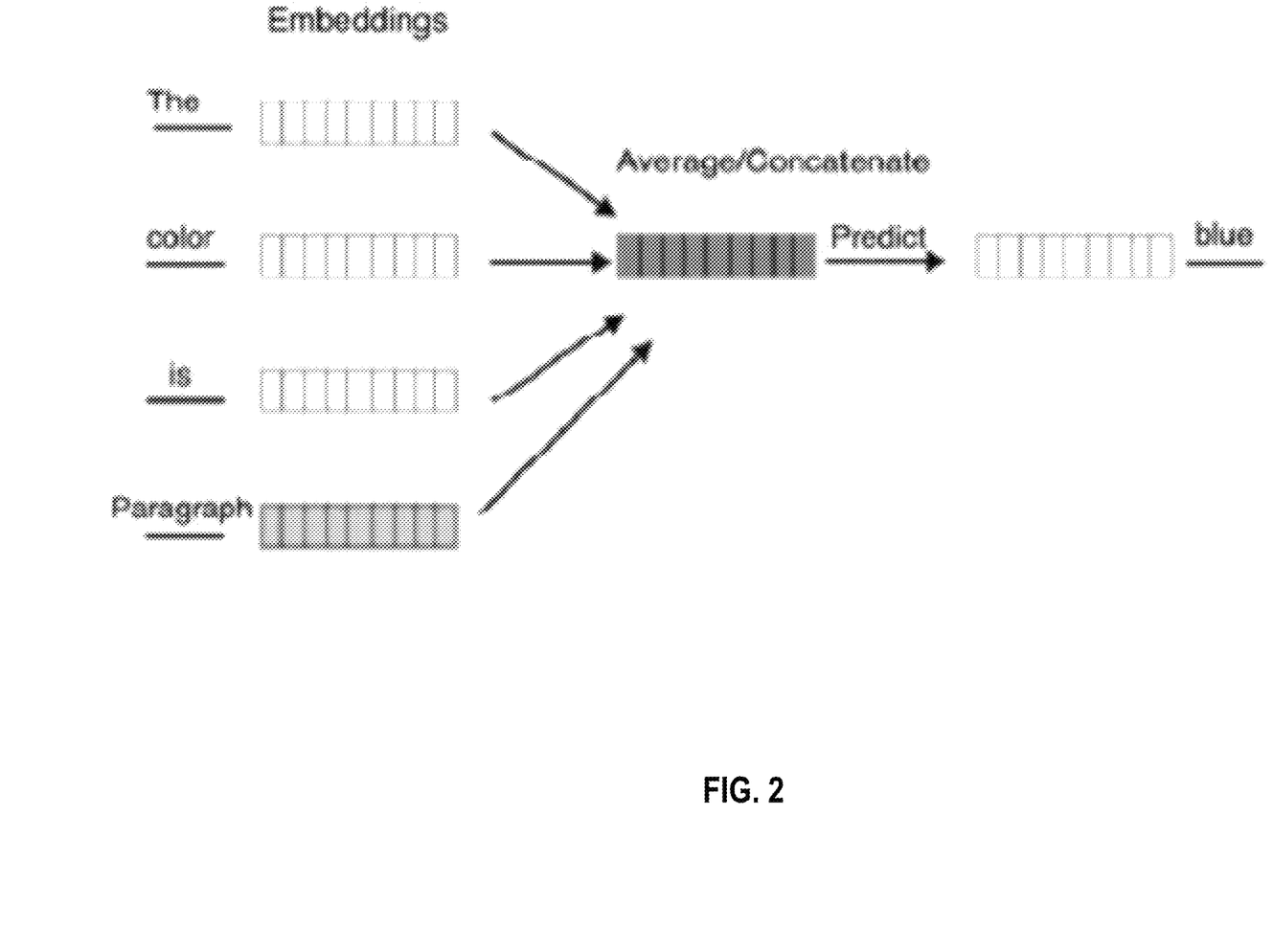
FIG. 2 is a simplified illustration showing a framework for learning paragraph vectors.

To learn the distributed representation for an entire post of the textual information 103, the intuition of learning word embeddings is followed. Here, instead of predicting a context for a particular word, the model samples multiple contexts from the paragraph and predicts the next word given the context (FIG. 2). The context is obtained using a sliding window of length k over the paragraph. The representation is learned using stochastic gradient descent and gradients are calculated using back propagation.

All the posts of the textual information 103 may be used to learn distributed representations, since having a larger corpus helps to learn better embeddings. One of the advantages of using the paragraph vector algorithm 105 is that it simplifies the task of handling multiple languages. Posts in different languages are embedded in the same vector space, making their comparison easier. In addition, since they may naturally fall into different clusters within this space, it is easy to identify the language of the post, which may help learn the language bias in D2Web vulnerability posts leading to more accurate exploit prediction.

Classification

Exploit prediction may be formulated as a classification task. Given a set of posts discussing vulnerabilities and the ground truth data 111 that includes positive examples (vulnerabilities for which exploits exist in the wild), the classifier 113 is trained to recognize posts from the textual information 103 that discuss exploited vulnerabilities. Vectors representing post embeddings and a number of times a vulnerability was mentioned in D2Web (frequency of mention) are used as features 107 for building, training, and/or configuring the classifier 113. Then, given a new post mentioning a vulnerability, the classifier 113 predicts whether that vulnerability will be exploited by generating the exploit prediction 115.

Any number or type of classifiers may be used for the classifier 113. In some embodiments, Support Vector Machines (SVM) with Radial basis function (RBF) kernel may perform better than other examined classifiers. SVM is a supervised learning model which finds a set of hyperplanes that best separate different classes by having the largest margin. Using Random Forest classifier was also explored, a combination of decision trees, in which random selection of features are given and the final output is decided by taking a vote from individual tree predictors.

The exploit prediction framework 101 was tested using a dataset of the textual information 103 containing almost 2,500,000 messages posted on a variety of darkweb and deepweb sites over a period from 2010 through 2017. These posts were in 17 different languages, with English, Arabic, and Russian being the most common languages. Vulnerabilities mentioned in D2Web posts were identified using regular expression patterns to match CVEs (Common Vulnerabilities and Exposures), the unique identifiers of vulnerabilities. Since the goal is to predict vulnerabilities that are likely to be exploited, the posts referencing vulnerabilities after the exploitation date were removed from the data. This filtering step left 4,898 posts mentioning 1886 distinct CVEs, some vulnerabilities were mentioned in more than one post. For the posts mentioning more than one vulnerability, only the less frequently mentioned CVE was considered. The ground truth data 111 was obtained from two sources: (1) Symantec's anti-virus and Intrusion Detection Systems attack signatures and (2) a database of the exploits deployed for Metasploit.

Results

Symantec attack signatures report exploits detected in the wild and their corresponding vulnerabilities, along with the time the exploit was discovered. Metasploit is a popular open source penetration testing framework which allows usage of install-and-test exploits developed by the cybersecurity community and a company called Rapid7. Each Metasploit's exploit is reported with the date it was deployed. The vulnerabilities mentioned on D2Web were labeled positive, if they have a corresponding attack signature in Symantec's list or exploits available on Rapid7's site, and negative otherwise. Of the CVE mentioned on D2Web, only 149 are classified as exploited—these represent only 8% of the vulnerabilities in the dataset.

Exploit Prediction

Another embodiment of the classifier 113 was trained to recognize vulnerabilities discussed in posts that will be subsequently exploited. $F_1$ score and AUC (area under the "Receiver Operating Characteristics" curve) were used to evaluate classification performance. To optimize performance, parameters may be tuned to the data. Most of the parameters are for learning the embeddings, including dimension of the representations, window size, the degree of negative sampling, and frequency threshold for words. Having a high dimension space gives the model the ability to better represent the posts; however, it takes more space and might lead to sparse representations. Window is the context referred to in previous sections, used for predicting the next word. Higher window sizes takes longer to train but it might be able to better capture the context. Negative sampling means randomly sampling words which do not co-occur together, and minimizing the probability of observing those words together.

Comparison to Baseline

Figure 3:
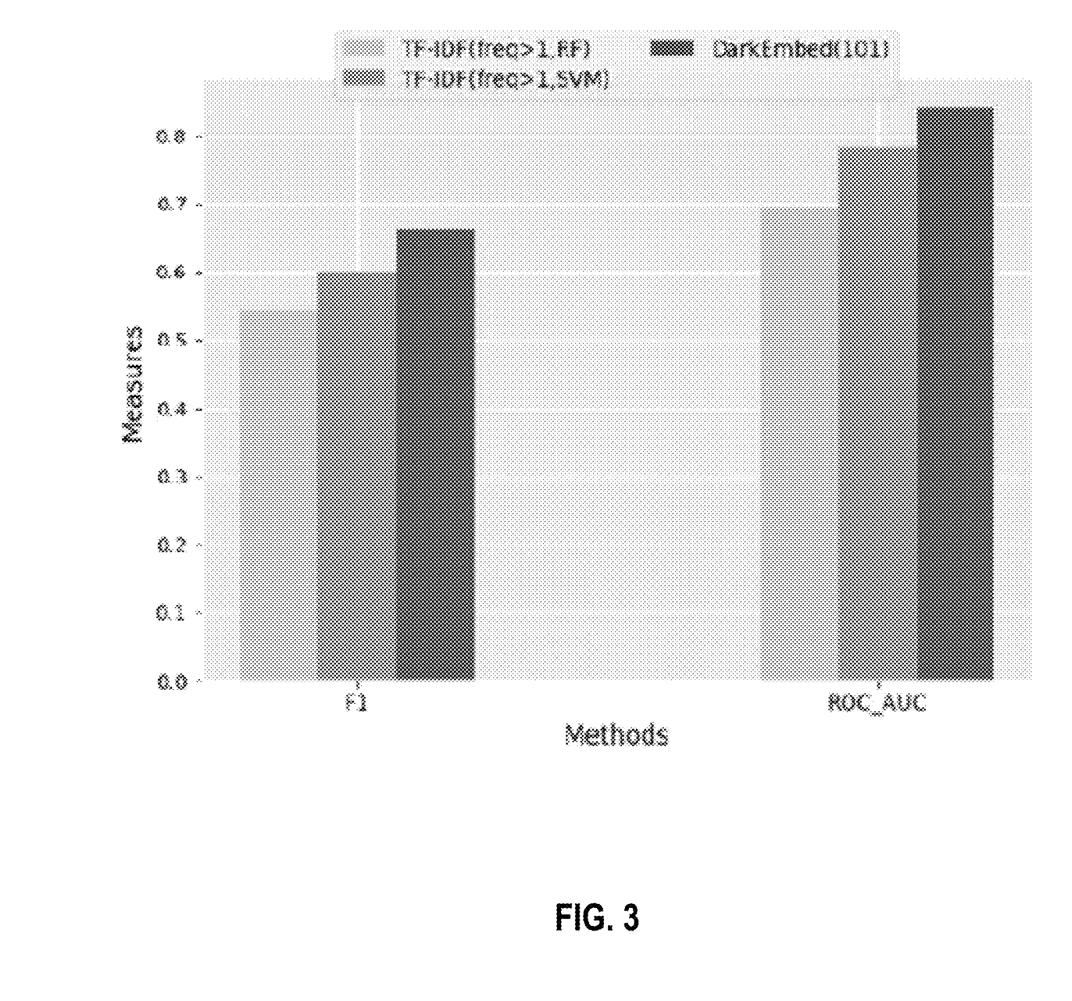
FIG. 3 is a graphical representation showing the comparison of the performance of classifiers for vulnerability exploit prediction.

As an alternative to word embeddings, a term-frequency-inverse document frequency (TF-IDF)-based representation of D2Web posts may be used as the baseline for comparing performance. This approach is similar in spirit to existing work that predicts exploits based on online discussions of vulnerabilities. TF-IDF approach represents posts as vectors with the same length as the vocabulary of the entire text corpus, i.e., posts. Each entry in the vector corresponds to a unique word, and its weight gives the frequency of that word in the post (TF) divided by its document frequency (IDF), i.e., the number of posts in which the word appears. Since the TF-IDF vectors can be quite large, classification methods using them would experience slow processing time and large memory usage. To reduce the size of document vectors, instead of the entire vocabulary, often a subset of the most frequent words is used to represent the documents. These document vectors are then used in the classification task. Also since TF-IDF results in high dimensional representations, random forest can usually perform better in these problems, hence both classifiers (support vector machine (SVM) and Random Forest) were used on TF-IDF features. FIG. 3 illustrates the performance of (1) the random forest classifier and (2) the SVM classifier on TF-IDF vectors as features. The TF-IDF vectors were constructed for words appearing more than once in the dataset (61,995 words). Finally, the figure also reports the performance of the present system using a 101 dimensional embedding space. The present system outperforms the baseline method.

Adding Features

Figure 4:
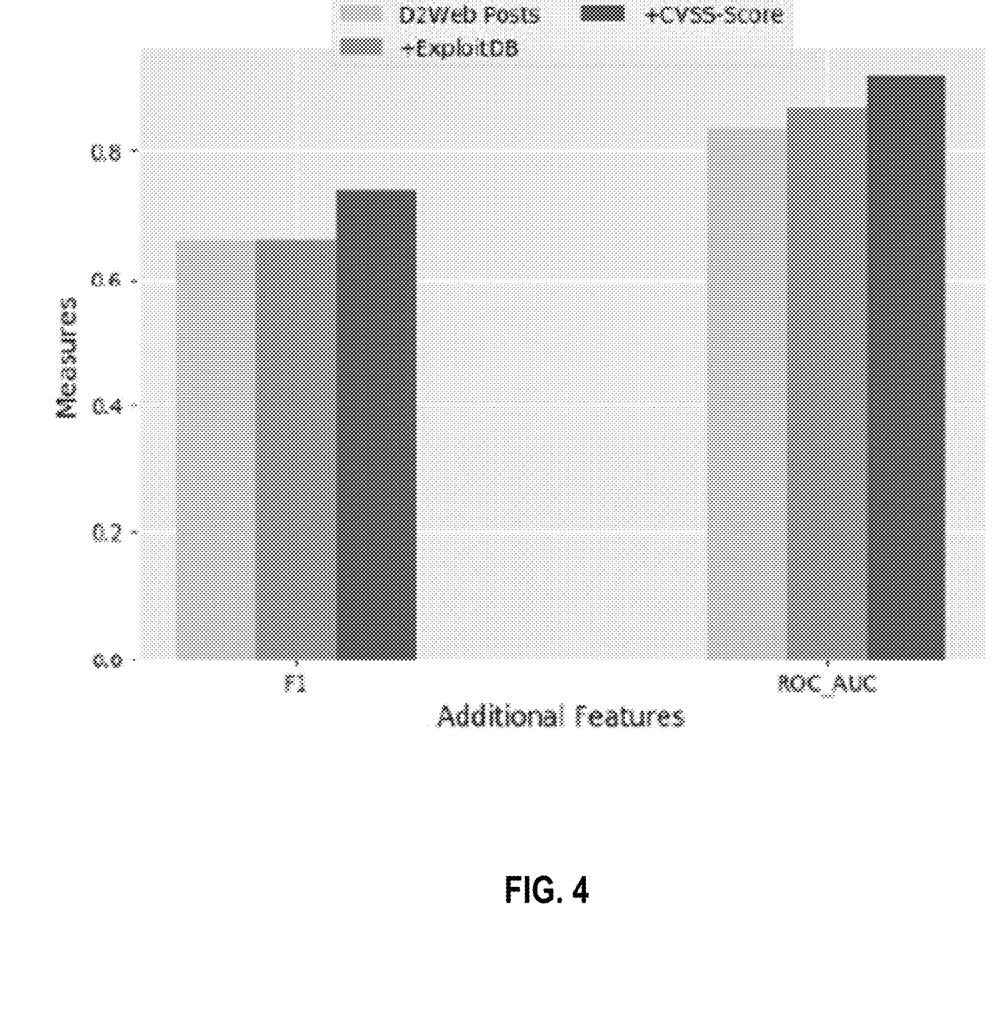
FIG. 4 is a graphical representation showing the performance of classifiers using additional features on the vulnerability exploit prediction task.

Post embeddings can be combined with other features of vulnerabilities to improve performance of exploit prediction. For example a binary feature indicating whether the vulnerability appears in ExploitDB, or its CVSS scores from NVD, can be used by the classifiers to improve performance. To illustrate, CVSS scores for each vulnerability and a binary feature for ExploitDB were combined with D2Web post's embeddings. The added features improved classification performance from $F_1$ measure of 0.66 to 0.74. FIG. 4 shows that incrementally adding each feature improves classifier performance.

Using Security Blogs

As mentioned earlier, the ground truth for this task was obtained from Symantec and Metasploit penetration tools. Although most cyber-attacks are caused by a handful of vulnerabilities, which are already included in the ground truth, there are other exploited vulnerabilities that are not included in these sources. To address this gap in the ground truth, blogs written by cyber security experts were used to identify new exploited vulnerabilities. Blog posts were collected from 218 cyber security experts, covering a period from 2001 to 2017.

TABLE 1

Classification results on different methods

| Method | $F_1$ | AUC |
|---|---|---|
| Baseline methods | | |
| TF-ID(RF) | 0.54 | 0.69 |
| TF-IDF(SVM) | 0.60 | 0.78 |
| Present System | | |
| 101 dimensions | 0.66 | 0.84 |
| Adding features to the Present System (101 dim) | | |
| +ExploitDB | 0.66 | 0.87 |
| +CVSS-Score | 0.74 | 0.92 |
| Using blogs to detect exploited vulnerabilities | | |
| Blogs | 0.80 | 0.87 |

To identify exploited vulnerabilities mentioned in blogs, the present system's approach was applied to blogs by using embeddings of blogs, along with other features, to classify vulnerabilities. Here, posts published after exploit date were not filtered as the aim is to detect exploited vulnerabilities instead of predicting them. Also, posts mentioning a single vulnerability were only considered. The exploit prediction framework used embedding of size 150 (blog posts are lengthier that darkweb posts), CVSS score and number of times a vulnerability was mentioned in this dataset as features. Note that the optimal embedding size was obtained through cross validation. With 1613 blog posts in the dataset, $F_1$=0.80 and AUC=0.87 were achieved.

TABLE 2

Software related discriminative words identified by the present system

| Category | Words | # of vul. | # of exploits | % exploits |
|---|---|---|---|---|
| Positive | Flash | 19 | 14 | 73.7% |
| | Adobe | 21 | 14 | 66.7% |
| | XP | 16 | 10 | 62.5% |
| | Microsoft | 68 | 25 | 36.8% |
| | Windows | 42 | 13 | 31.0% |
| Negative | iOS | 4 | 0 | 0% |
| | Samba | 7 | 0 | 0% |
| | Kernel | 16 | 0 | 0% |
| | Android | 30 | 0 | 0% |
| | Linux | 38 | 6 | 15.8% |

Distinctive Words

In order to better interpret results, key words in D2Web were identified indicative of exploitability. Using classifications of the final classifier, D2Web posts were separated into two classes: posts mentioning exploited vulnerabilities (positive) and other posts (negative). Frequencies of words in a specific class relative to the size of the class were calculated. The words with highest difference in relative frequencies between the two classes were marked as distinctive words of that class. Since D2Web posts are in different languages many of these words were not in English.

The distinctive words identified fall into two categories: general purpose words and software related words. Some general words indicative of exploitation identified using the present system are "exploit", "vulnerable" and "push" while those associated with low exploitation probability are "long", "char" and "local". Table 2 shows words related to software identified by the disclosed model to positively and negatively impact exploitability. It was observed that the software detected correlate with the exploits in the wild. For example, more than 50% of the vulnerabilities of Flash, Adobe, and Microsoft were exploited, whereas none of vulnerabilities associated with iOS, Samba and Android were exploited.

Exemplary Computing Device Configured for Exploit Prediction

Figure 5:
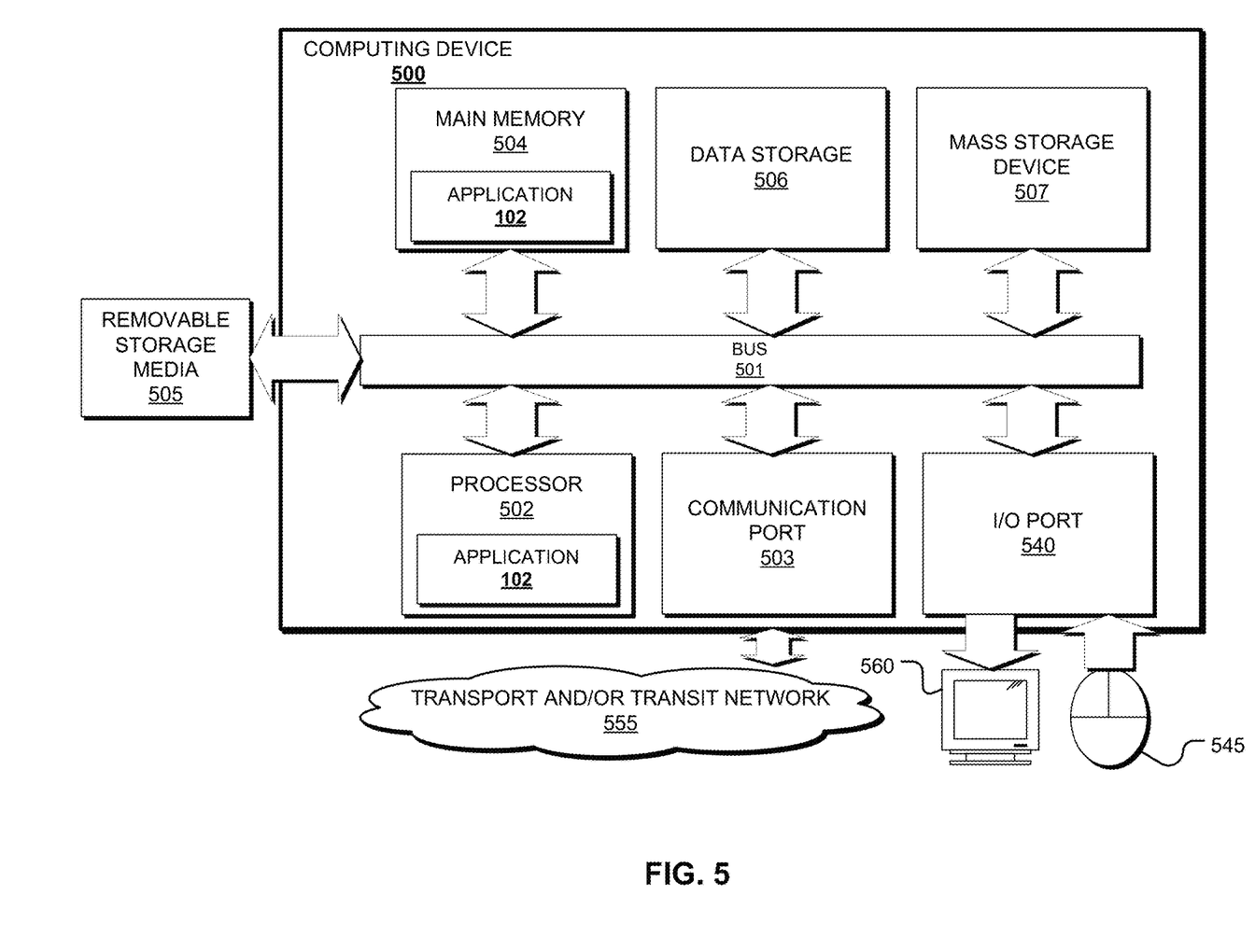
FIG. 5 is an example schematic diagram of a computing system that may implement various methodologies of the exploit prediction framework.

Referring to FIG. 5, a computing device 500 may be used to implement various aspects of the framework 101 described herein. More particularly, in some embodiments, aspects of the framework 101 may be translated to software or machine-level code, which may be installed to and/or executed by the computing device 500 such that the computing device 500 is configured to predict and/or prioritize possible exploits as described herein. It is contemplated that the computing device 500 may include any number of devices, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments, and the like.

The computing device 500 may include various hardware components, such as a processor 502, a main memory 504 (e.g., a system memory), and a system bus 501 that couples various components of the computing device 500 to the processor 502. The system bus 501 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 500 may further include a variety of memory devices and computer-readable media 507 that includes removable/non-removable media and volatile/non-volatile media and/or tangible media, but excludes transitory propagated signals. Computer-readable media 507 may also include computer storage media and communication media. Computer storage media includes removable (505)/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computing device 500. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 504 includes computer storage media in the form of volatile/nonvolatile memory such as read only memory (ROM) and random access memory (RAM). A basic input/output system (BIOS), containing the basic routines that help to transfer information between elements within the computing device 500 (e.g., during start-up) is typically stored in ROM. RAM typically contains data and/or program modules that are immediately accessible to and/or presently being operated on by processor 502. Further, data storage 506 in the form of Read-Only Memory (ROM) or otherwise may store an operating system, application programs, and other program modules and program data.

The data storage 506 may also include other removable/non-removable, volatile/nonvolatile computer storage media. For example, the data storage 506 may be: a hard disk drive that reads from or writes to non-removable, nonvolatile magnetic media; a magnetic disk drive that reads from or writes to a removable, nonvolatile magnetic disk; a solid state drive; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules, and other data for the computing device 500.

A user may enter commands and information through a user interface 540 (displayed via a monitor 560) by engaging input devices 545 such as a tablet, electronic digitizer, a microphone, keyboard, and/or pointing device, commonly referred to as mouse, trackball or touch pad. Other input devices 545 may include a joystick, game pad, satellite dish, scanner, or the like. Additionally, voice inputs, gesture inputs (e.g., via hands or fingers), or other natural user input methods may also be used with the appropriate input devices, such as a microphone, camera, tablet, touch pad, glove, or other sensor. These and other input devices 545 are in operative connection to the processor 502 and may be coupled to the system bus 501, but may be connected by other interface and bus structures, such as a parallel port, game port or a universal serial bus (USB). A monitor 560 or other type of display device may also be connected to the system bus 501. The monitor 560 may also be integrated with a touch-screen panel or the like.

The computing device 500 may be implemented in a networked or cloud-computing environment using logical connections of a network interface 503 to one or more remote devices, such as a remote computer. The remote computer may be a personal computer, a server, a router, a network PC, a peer device or other common network node, and typically includes many or all of the elements described above relative to the computing device 500. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computing device 500 may be connected to a public and/or private network (555) through the network interface 503. In such embodiments, a modem or other means for establishing communications over the network is connected to the system bus 501 via the network interface 503 or other appropriate mechanism. A wireless networking component including an interface and antenna may be coupled through a suitable device such as an access point or peer computer to a network. In a networked environment, program modules depicted relative to the computing device 500, or portions thereof, may be stored in the remote memory storage device.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure the processor 502, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method, comprising:
utilizing a neural network to learn a context-based distributed representation from data associated with the deep or dark web, the data including discussions about vulnerabilities and corresponding exploits; and
training a classifier utilizing the context-based distributed representation as a feature to the classifier such that the classifier is configured to output a classification for predicting an exploitation of a vulnerability associated with a communication, the classification considering a context of words from the communication,
wherein the classifier is implemented using a support vector machine with a radial basis kernel, wherein the support vector machine classifies communications by finding a set of hyper-planes that best separates each of the communications into a class.

2. The method of claim 1, wherein the context-based distributed representation includes a paragraph embedding defined by a distributed representation of an entire post of the data to learn a global context of words in the entire post.

3. The method of claim 2, wherein the context-based distributed representation comprises a word embedding that projects words in a lower-dimensional vector space with d dimensions, so that each word $w_i$ is represented by a d-dimensional vector.

4. The method of claim 1, wherein the classifier utilizes further features including a frequency of mention or a common vulnerability scoring system (CVSS) score.

* * * * *